(12) United States Patent
High et al.

(10) Patent No.: US 12,110,198 B2
(45) Date of Patent: Oct. 8, 2024

(54) RETRACTABLE TABLE TOWER FOR UAV PACKAGE DELIVERY

(71) Applicant: Walmart Apollo, LLC, Bentonville, AR (US)

(72) Inventors: Donald R. High, Noel, MO (US); Robert Cantrell, Herndon, VA (US); Brian McHale, Oldham (GB)

(73) Assignee: Walmart Apollo, LLC, Bentonville, AR (US)

( * ) Notice: Subject to any disclaimer, the term of this patent is extended or adjusted under 35 U.S.C. 154(b) by 1530 days.

(21) Appl. No.: 16/260,683

(22) Filed: Jan. 29, 2019

(65) Prior Publication Data

US 2019/0236521 A1      Aug. 1, 2019

Related U.S. Application Data

(60) Provisional application No. 62/624,685, filed on Jan. 31, 2018.

(51) Int. Cl.
   *B65G 67/00*     (2006.01)
   *B64C 39/02*     (2023.01)
   *B64D 1/12*      (2006.01)
   *B64U 101/60*    (2023.01)
   (Continued)

(52) U.S. Cl.
   CPC ............ *B65G 67/00* (2013.01); *B64C 39/024* (2013.01); *B64D 1/12* (2013.01); *G06Q 10/083* (2013.01); *H04W 4/029* (2018.02); *B64U 2101/60* (2023.01); *B65G 2814/0398* (2013.01)

(58) Field of Classification Search
   CPC ............... G06Q 10/083; B64C 39/024; B64C 2201/128; B64D 1/12; B64D 47/08; B65G 67/00; B65G 2814/0398; H04W 4/029; B64F 1/007; B64F 1/32; B64U 2101/60
   See application file for complete search history.

(56) References Cited

U.S. PATENT DOCUMENTS

| 9,840,340 | B2 | 12/2017 | O'Toole |
| 9,862,503 | B2* | 1/2018 | Chavez, Jr. ............. B64F 1/029 |
| 11,235,890 | B1* | 2/2022 | Dahlstrom .......... B05C 11/1005 |

(Continued)

FOREIGN PATENT DOCUMENTS

WO     2017173311 A1    10/2017

OTHER PUBLICATIONS

Shane McGlaun, "Matternet Station supports fully automated battery and package exchange for drone networks", slashgear.com, Sep. 20, 2017, pp. 1-4.

(Continued)

*Primary Examiner* — Jeffrey A Shapiro
(74) *Attorney, Agent, or Firm* — Morgan, Lewis & Bockius LLP; Manita Rawat

(57) ABSTRACT

A delivery tower for receiving a package from an aerial vehicle. The delivery tower has a table top coupled to a base. The base includes telescoping members. The delivery tower has a controller and communications module operably coupled to the base. The table top moves between a first, retracted position and a second, extended position with extension of the telescoping members. In the first, retracted position the delivery tower is configured to operate as an outdoor table. In the second, extended position, the delivery tower is configured to receive a package from the aerial vehicle.

15 Claims, 8 Drawing Sheets

(51) Int. Cl.
*G06Q 10/083* (2023.01)
*H04W 4/029* (2018.01)

(56) References Cited

U.S. PATENT DOCUMENTS

| | | | | |
|---|---|---|---|---|
| 2014/0252162 | A1* | 9/2014 | Teller | B64F 1/10 |
| | | | | 244/63 |
| 2015/0175276 | A1* | 6/2015 | Koster | B64F 1/32 |
| | | | | 244/114 R |
| 2015/0183528 | A1 | 7/2015 | Walsh et al. | |
| 2016/0033966 | A1 | 2/2016 | Farris et al. | |
| 2016/0101874 | A1 | 4/2016 | McKinnon et al. | |
| 2016/0144982 | A1* | 5/2016 | Sugumaran | B64F 1/36 |
| | | | | 244/108 |
| 2016/0364989 | A1* | 12/2016 | Speasl | B64F 1/222 |
| 2017/0137150 | A1* | 5/2017 | Conyers | B64F 1/007 |
| 2017/0147975 | A1 | 5/2017 | Natarajan et al. | |
| 2017/0175413 | A1* | 6/2017 | Curlander | E04H 14/00 |
| 2017/0313421 | A1* | 11/2017 | Gil | H04L 67/55 |
| 2018/0092484 | A1* | 4/2018 | Lewis | A47G 29/20 |
| 2018/0105289 | A1* | 4/2018 | Walsh | A47G 29/141 |
| 2018/0186454 | A1* | 7/2018 | Luckay | B64D 1/12 |
| 2018/0273308 | A1* | 9/2018 | Schroeder | B65G 43/08 |
| 2018/0354625 | A1* | 12/2018 | Verkade | B64D 9/00 |
| 2018/0357909 | A1* | 12/2018 | Eyhorn | G08G 5/0039 |
| 2019/0100314 | A1* | 4/2019 | Prager | B66D 1/60 |

OTHER PUBLICATIONS

Uptin Saiidi, "Airbus drone set to deliver parcels throughout a university campus", CNBC, Feb. 12, 2018, pp. 1-3.
"Safe Drone Delivery by Cleveron", Cleveron, Nov. 14, 2016, pp. 1-2.

* cited by examiner

RETRACTABLE TABLE TOWER FOR UAV PACKAGE DELIVERY

CROSS REFERENCE TO RELATED APPLICATIONS

This present Patent Application claims priority benefit from U.S. Provisional Patent Application No. 62/624,685 filed on Jan. 31, 2018, the entire content of which is hereby incorporated herein by reference.

TECHNICAL FIELD OF THE INVENTION

The present application relates to delivery tower for receiving a package from an aerial vehicle. More specifically, the present application relates to a retractable delivery tower for aerial vehicle package delivery.

BACKGROUND OF THE INVENTION

Currently, delivery towers have been made for receiving packages from unmanned aerial vehicles (UAVs). UAVs may be programed for a controlled delivery from a first controlled point (such as a warehouse or store) to a second controlled point, or delivery tower. Existing delivery towers may be sophisticated, expensive, complex, and have a large permanent footprint. Thus, existing delivery towers are not suitable for smaller delivery locations, such as homes and urban areas. Therefore, a need exists for a delivery tower which may be used in a home and may reduce the cost and footprint of existing delivery towers. A need further exists for a delivery tower which may have multiple uses that may create greater value for customers and reduce the drawbacks of having a permanent delivery tower installed in a particular location.

BRIEF SUMMARY OF THE INVENTION

According to an embodiment of the present disclosure, a delivery tower for receiving a package from an aerial vehicle may include a table top coupled to a base, the base including telescoping members and a controller and communications module operably coupled to the base. The table top may be configured to move between a first, retracted position and a second extended position with extension of the telescoping members. In the first, retracted position the delivery tower is configured to operate as an outdoor table and in the second, extended position, the delivery tower is configured to receive a package from the aerial vehicle. The delivery tower is configured to communicate with the aerial vehicle or a consumer and is further configured to automatically move between the first, retracted position and the second extended position after receipt of a signal from the aerial vehicle or the consumer According to an embodiment of the present disclosure a method for aerial delivery of a package to a delivery location may include providing a delivery tower on a consumer's property, moving the delivery tower from a first location to a second location, the location including an open space, based on a first signal communicated from an aerial vehicle to the delivery tower when the aerial vehicle is within a predetermined distance from the delivery tower, extending the table top from a retracted position to an extended position based on a second signal communicated from the aerial vehicle to the delivery tower, depositing the package from the aerial vehicle onto the table top of the delivery tower, retracting the table top from the extended position based on a third signal communicated from the aerial vehicle to the delivery tower, and retrieving the package from the table top.

BRIEF DESCRIPTION OF DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. A person skilled in the relevant art would recognize that other equivalent parts can be employed and other methods developed without departing from the spirit and scope of the invention. All references cited herein are incorporated by reference as if each had been individually incorporated.

The present disclosure relates to delivering packages to a particular location, such as a home or store (such as a corner store, convenience store, etc.), or other location. The particular location of delivery may include a delivery tower, such as a retractable delivery tower, as will be described below. The retractable delivery tower may extend and retract vertically, horizontally, or diagonally. The retractable delivery tower may be in an extended position when a package is to be delivered. The retractable delivery tower may be in a retracted position when a package is not being delivered and may have other uses, such as a picnic table, dining table, or other table type. The retractable delivery tower may have a controller and/or communications module for controlling the retraction and extension of the retractable delivery tower and for communicating with the aerial vehicle, such as a UAV.

Figure 1:
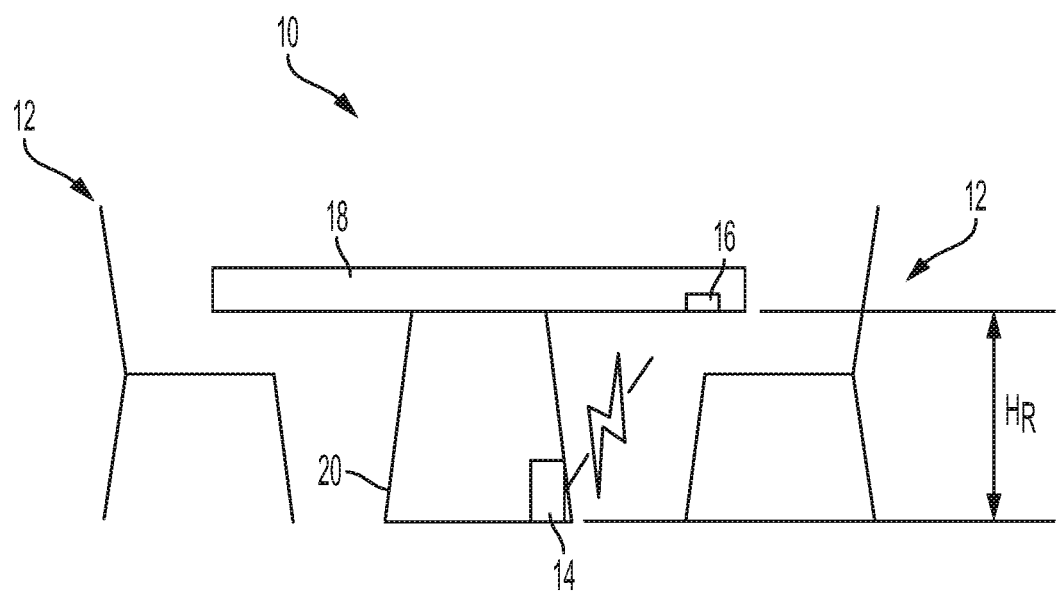
FIG. 1 shows a schematic of a retractable delivery tower in a retracted position, according to an embodiment of the present disclosure.
Figure 2:
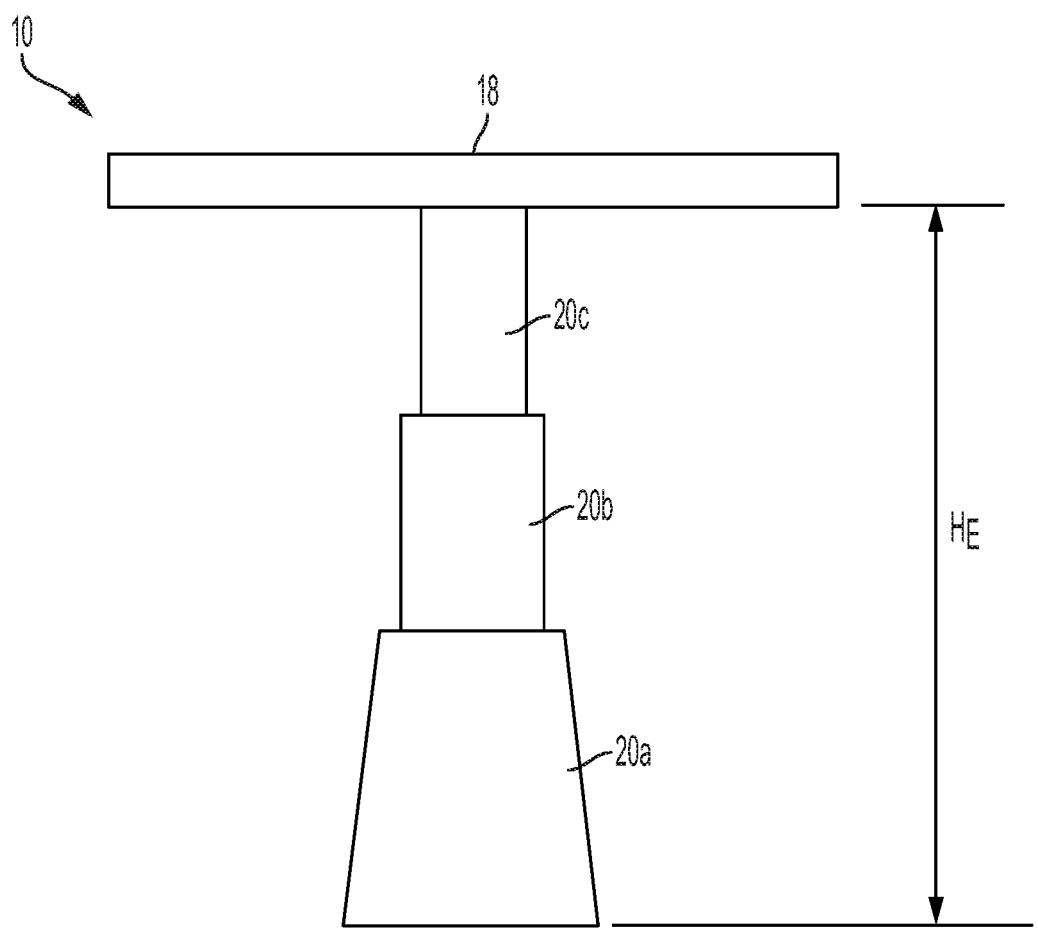
FIG. 2 shows a schematic of the retractable delivery tower of FIG. 1 in an extended position, according to an embodiment of the present disclosure.

Referring to FIG. 1, a schematic view of a delivery tower 10, such as a retractable delivery tower, is shown. The delivery tower 10 may have two positions, a retracted position (FIG. 1) and an extended position (FIG. 2). In the retracted position, the delivery tower 10 may have a use separate from receiving a package. For example, the delivery tower 10 may be an outdoor dining table, a picnic table, a patio table, other table, bench, or platform etc. In the example shown in FIG. 1, the delivery tower 10 may be an outdoor table having chairs 12. As may be appreciated, in the position of FIG. 1, the delivery tower 10 may allow consumers to sit in the chairs 12 and use the table (delivery tower 10) in a conventional, well known manner. The delivery tower 10 may have a table top 18 with a flat top. The table top 18 may be a landing pad.

With continued reference to FIG. 1, the delivery tower 10 may further include a base 20 having a controller and communications module 14. The module 14 may include a controller for controlling the position, such as a height position, of the delivery tower 10. The module 14 may include a communications device for communicating, sending and/or receiving signals or instructions to and from the aerial vehicle. The module 14 may include a communication device for communicating, sending and/or receiving signals or instructions to and from a consumer, such as a consumer's mobile phone or mobile tablet or other device. The module 14 may include both the controller and communications device or they may be provided separately. The module 14 may allow for the delivery tower 10 to operate partially or wholly autonomously. The module 14 may provide the location of the delivery tower 10, verification, or a picture of the delivery tower 10 and/or location of the delivery tower 10 so the aerial vehicle is able to verify the delivery tower 10 is in the proper position for receiving a package.

Alternatively, or additionally, the delivery tower 10 may have a manual control 16 for controlling the position, such as a height position, of the delivery tower 10. The manual control 16 may include buttons, for example, an up button for extending the table top 18 and a down button for retracting the table top 18.

Referring now to FIG. 1, the delivery tower 10 may be in the retracted position during normal operating conditions. That is, the delivery tower 10 may have a preference for the retracted position of FIG. 1. A consumer may place an order for a product in the conventional manner, such as by telephone, mobile device, or computer, etc. The product may be packaged and scheduled for delivery to the consumer. The package may be delivered to the consumer with an autonomous vehicle and/or aerial vehicle, such as a UAV. When the aerial vehicle is near the delivery location, for example, within a about a mile of the delivery location, the aerial vehicle may communicate with the consumer (e.g., through a mobile application, a computer, telephone, text messaging, etc.) and/or the delivery tower 10 (e.g., via the module 14), as previously described. The aerial vehicle may inform or alert the consumer and/or the delivery tower 10 that the package is imminent. In the example where the aerial vehicle informs the delivery tower 10, the delivery tower 10 may in turn alert or inform the consumer that the package is imminent (e.g., through the mobile application, the computer, telephone, text messaging, etc.). The aerial vehicle may send a signal to the delivery tower 10 and/or the consumer with instructions to extend the table top 18 from the retracted, first height HR (FIG. 1) to the extended, second height HE (FIG. 2). The aerial vehicle and/or the consumer may send instructions to the delivery tower 10 such that the delivery tower 10 automatically moves between the retracted and extended positions.

With reference to FIG. 2, the controller of module 14 (FIG. 1) may operate a linear actuator (not visible) located inside of or as a part of the base 20, to extend the base 20 and thus the table top 18 to the extended, second height HE. The linear actuator may be, for example, a linear motor, linear induction motor, worm and gear, hydraulic cylinder, pneumatic actuator, hydraulic actuator, or other linear actuator. The base 20 may include telescoping members 20a, 20b, 20c. Telescoping members 20a and 20b may nest within telescoping member 20c in the retracted position of FIG. 1. Telescoping members 20a and 20b may be operated to extend out of the telescoping member 20c via the linear actuator when the table top 18 is moved to the extended position of FIG. 2. Although shown with all of members 20a, 20b, and 20c visible in the extended position of FIG. 2, alternate heights of the table top 18 are contemplated. For example, the table top 18 may be able to stop at any position having a height HE between the first height HR and a maximum allowed height of the table top 18.

Once the table top 18 is extended to the second height HE, which may be selected by the aerial vehicle and/or consumer and communicated to the module 14 based on certain parameters, such as size and weight of the package, the aerial vehicle may deliver the package onto the table top 18. The consumer and/or the delivery tower 10 may send a signal to the aerial vehicle (either via a mobile device, computer, phone, etc., or via the module 14) indicating that the delivery tower 10 is in the extended position for delivery of the package. The consumer, the mobile device and/or the delivery tower 10 may send the location of the delivery tower (e.g. GPS coordinates or geolocation) to the aerial vehicle. Alternatively, the mobile device may send the location of the delivery tower through the GPS coordinates or geolocation of the mobile device. In this instance, the mobile device may be placed on the table top 18 or in a designated slot of the table top. The designated slot may be a secured, but accessible location on the table top that protects the mobile device during delivery and/or landing of the aerial vehicle.

The aerial vehicle may deliver the package onto the table top 18. Delivery of the package onto the table top 18 may be performed in a conventional manner, such as a drop, parachute drop, cable drop, net drop, and other manners for aerial package delivery. The aerial vehicle may then communicate with the delivery tower 10 via the module 14 or with the consumer to indicate the package has been deposited on table top 18. The consumer may then retrieve the package from the delivery tower 10. After the package has been retrieved from the landing pad, the consumer may retract the delivery tower 10 and/or the delivery tower 10 may automatically retract to once again place the delivery tower 10 in the retracted position.

Alternatively, the aerial vehicle may send a signal to the delivery tower 10 instructing the delivery tower 10 to retract the table top 18 to the first height HR of FIG. 1 prior to retrieval of the package from the table top 18. The first height HR or other height that may be a height that is easy to reach by the consumer. The consumer may then retrieve the package from the delivery tower 10. When the retractable deliver tower 10 retracts or nests (e.g. when the telescoping members nest), the table top 18 naturally brings the package to a level that is easy to reach by sliding open or otherwise gaining access through what is normally a flat surface used as a table, as will be described in more detail.

The manual control 16 may be used to more finely adjust the height of the table top 18 during delivery of the package. Alternatively, the consumer may receive a notification of impending aerial package delivery. When the notification is received by the consumer, the consumer may use the manual control 16 to extend the table top 18 to the second height HE for receiving the package and may use the manual control 16 to retract the table top 18 to the retracted height for retrieving the package.

As mentioned, the consumer and/or the delivery tower 10 may receive a notification of impending aerial package delivery from the aerial vehicle. The notification may be a visual alert, such as a flashing of lights on the aerial vehicle or may be an e-mail notification, text messaging notification, mobile application alert, and/or mobile phone alert. When the notification is received by the consumer and/or the delivery tower 10, the consumer may proceed to place the delivery tower 10 in the proper position and height for receiving the package, as described previously. Notification of the receipt and/or completed delivery of the package may be an e-mail notification, text messaging notification, mobile application alert, and/or mobile phone alert.

Figure 3:
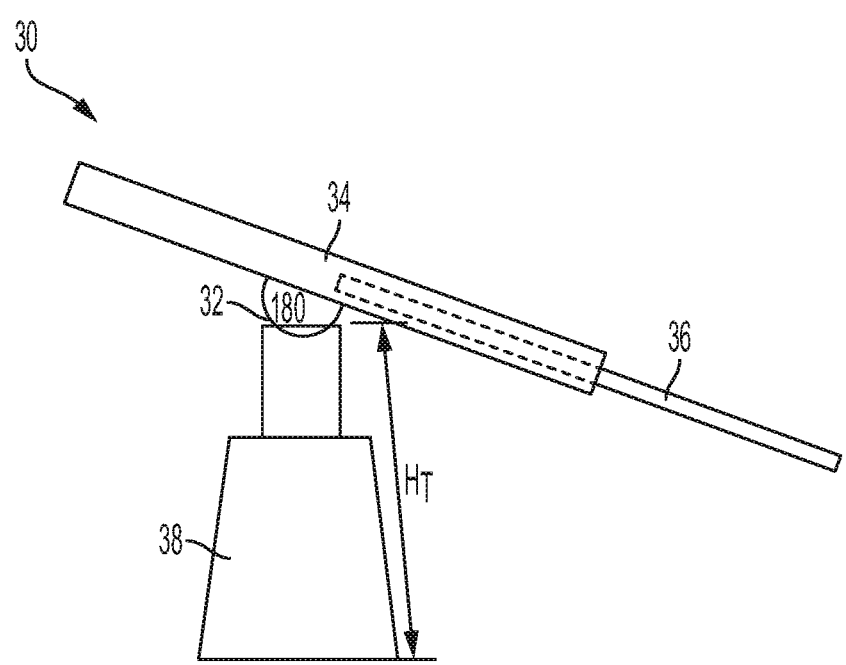
FIG. 3 shows a schematic of a retractable delivery tower in an extended position, according to an embodiment of the present disclosure.

Referring now to FIG. 3, a schematic of a delivery tower 30, such as a retractable delivery tower 30, is shown. The delivery tower 30 may operate in the same or similar manner as the delivery tower 10, as previously described. The delivery tower 30 may also include a tilting device 32. The tilting device 32 may tilt the table top 34 from a generally horizontal position (such as depicted in FIG. 1) to an angle position, such as depicted in FIG. 3. The delivery tower 30 may also have an extendable leaf 36 which may be extended out a side of the table top 34. Thus, after package delivery, the consumer may actuate the table top 34 to extend the leaf 36 and tilt the table top 34 such that the package may slide or be "poured" off of the table top 34. The consumer may extend the leaf 36 or tilt the table top 34 with a manual control device (such as manual control 16) and/or the leaf 36 and tilting may be performed automatically. The automatic extension of the leaf 36 and/or the tilting may be performed by communications sent between the aerial vehicle and the delivery tower 30 and/or between a consumer (e.g., consumer's mobile device) and the delivery tower 30 (such as with a module 14). Such a sliding or pouring ability may facilitate the retrieval of large, heavy, and/or awkward packages which are deposited on the table top 34.

With continued reference to FIG. 3, the base 38 may be extendable in the same or similar manner as base 20, as previously described. When the package is desired to be retrieved from the delivery tower 30, the table top 34 may be lowered to a third height HT which may allow for tilting of the table top 34 and/or extension of the leaf 36. The third height HT may be the same as the height HR, the height HE, or may be smaller, between, or larger than these heights. The third height HT may be a height where, when tilt and extended, the table top 34 with leaf 36 abuts or is adjacent or near to a ground surface to allow the package to slide onto the ground surface without damaging the package. The tilting device 32 may allow for tilting of the table top 34 in a range of 0 to 180 degrees in either the left or right directions of FIG. 3. The leaf 36 may extend out the side of the table top 34 in any direction (for example, left or right in FIG. 3). The tilting device 32 may be any device which allows this rotation, such as a ball and socket, or hinge, or a pin located in an aperture.

Figure 4:
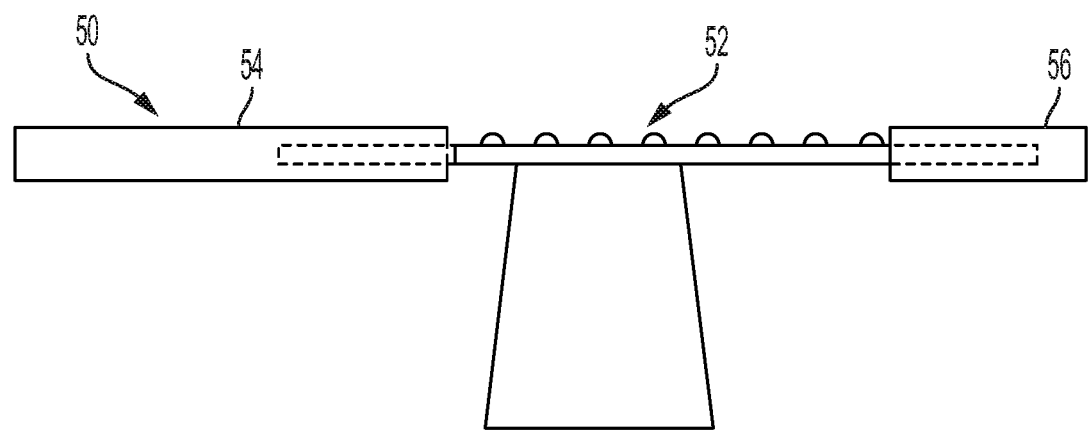
FIG. 4 shows a schematic of a retractable delivery tower in an extended position, according to an embodiment of the present disclosure.

Referring now to FIG. 4, a schematic of a delivery tower 50, such as a retractable delivery tower 50, is shown. The delivery tower 50 may operate in the same or similar manner as the delivery towers 10 and 30, as previously described. The delivery tower 50 may also include one or more rollers 52. The delivery tower 50 may include a two piece table top having a first table top portion 54 and a second table top portion 56. Before package delivery, the consumer and/or the aerial vehicle may actuate the table top to extend to the extended position (e.g., FIG. 2) and may actuate the table top portions 54, 56 to extend outward in opposing directions, exposing the rollers 52. The package may be delivered onto the rollers 52 and the delivery tower 50 may be lowered to the retracted position, in any of the manners previously described. Once the delivery tower 50 has been lowered, the consumer and/or the aerial vehicle may operate the rollers 52 to move the package to one of the table top portions 54, 56. The package may be pushed by the force of the rollers on to the selected table top portion 54, 56. The actuation may be manually, automatically by the aerial vehicle, and/or automatically and remotely by a mobile device. Alternatively, the package may be received with the table top portions 54, 56 in the inward position. Once the package is received, the table top portions 54, 56 may be actuate to extend in opposing directions, causing the package to move from the table top portions to the rollers. The rollers 52 may then be actuated to move the package to a retrieval position. Such a rolling ability may facilitate the retrieval of large, heavy, and/or awkward packages which are deposited on the table top portions 54, 56. Although rollers are depicted and described, a conveyor belt, wheels, rolling spheres, or other linear actuator or conveying device may be provided to move the package. The table top portions 54, 56 may slide away and expose rollers 52 prior to depositing of the package. The rollers 52 may be passive or may be powered to drive the package to one side (portion 54 or portion 56) of the table. The rollers 52 may be actuated automatically with the extension of the table top when the signal that the package is near is received by the delivery tower 50.

Any of the delivery towers 10, 30, 50 may comprise two extending leaves, similar to top portions 54, 56 of FIG. 4 or may include one panel or hatch that is retractable into the table top. The extending leaves or retractable panel may operate similar to a hatch or retractable door. That is, the package may be delivered onto the table top or through an opening provided by retraction of the hatch or leaves. If delivered to the table top, to retrieve the package, the retractable panel or leaves may be moved laterally such that an opening in the table is exposed or created. The package may fall through the opening for retrieval. Below the opening of the hatch/leaves may be a slide (FIG. 5), a platform, a catch net, soft surface, or other depositing platform that may receive the package. The retractable hatch or leaves may be closed after the package has been retrieved by the consumer or delivered to a secondary delivery point. As such the alternative use of the delivery tower may be appreciated without interference from the hatch. The secondary delivery point may be allowed to be locked or secured ensuring safe holding of the package until the consumer is able to retrieve the package. The delivery towers 10, 30, 50 may include an extendable platform which may extend through the leaves or hatch on the table top. During delivery of a package, the platform may extend up (e.g. via telescoping members) through the hatch, receive the package, and then retract down under the hatch. The hatch may protect the package, platform, and associated mechanics and components may be protected from the weather and/or debris and may provide a secure secondary delivery point to ensure safe holding of the package until the consumer is able to retrieve the package.

Figure 5:
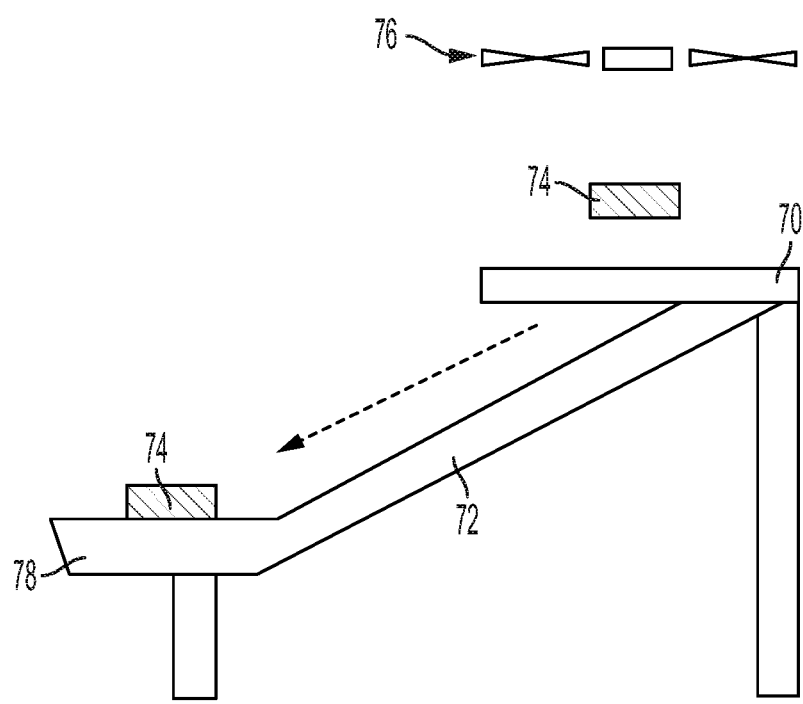
FIG. 5 shows a schematic of a retractable delivery tower having a slide, according to an embodiment of the present disclosure.

With reference to FIG. 5, the retractable hatch or leaves may open to reveal a platform 70 and slide 72. The package 74 may be released by the aerial vehicle 76 onto the table top (not shown). The hatch may open and the package 74 may fall or drop onto the platform 70. Alternatively, the hatch may open prior to the package 74 being release by the aerial vehicle. The package 74 may then slide down the slide 72 onto a secondary delivery point, such as second platform 78. The consumer may retrieve the package 74 from the platform 78. The slide 72 itself maybe retractable to a stored position such that it does not interfere with the delivery towers other uses. The second platform 78 may secured or locked until retrieval of the package 74 by the consumer. After delivery of the package, the trap door may open (automatically or manually) and the package may slide to the ground and/or to the secondary delivery point for retrieval. The secondary delivery point may be allowed to be locked or secured ensuring safe holding of the package until the consumer is able to retrieve the package. The slide may be foldable with the delivery tower or may be a separate component which may be removed and stored separately from the delivery tower.

As mentioned, the delivery towers 10, 30, 50 may include a secondary delivery point or lockbox to secure the package until retrieval by the consumer. In this manner, a consumer may extend the delivery tower 10, 30, 50 upward to the receiving height prior to delivery and then leave the delivery area. The aerial vehicle may communicate solely with the delivery towers 10, 30, 50 to deliver the package in the absence of the consumer. The package may be held safe in the lockbox until the package may be retrieved by the consumer, thus preventing theft or damage from weather or debris. The lockbox may be exposed in a similar manner to the previously described rollers or platform during delivery of the package. The lockbox may be fitted with a GPS tracker and/or communication device for package security.

Figure 6:
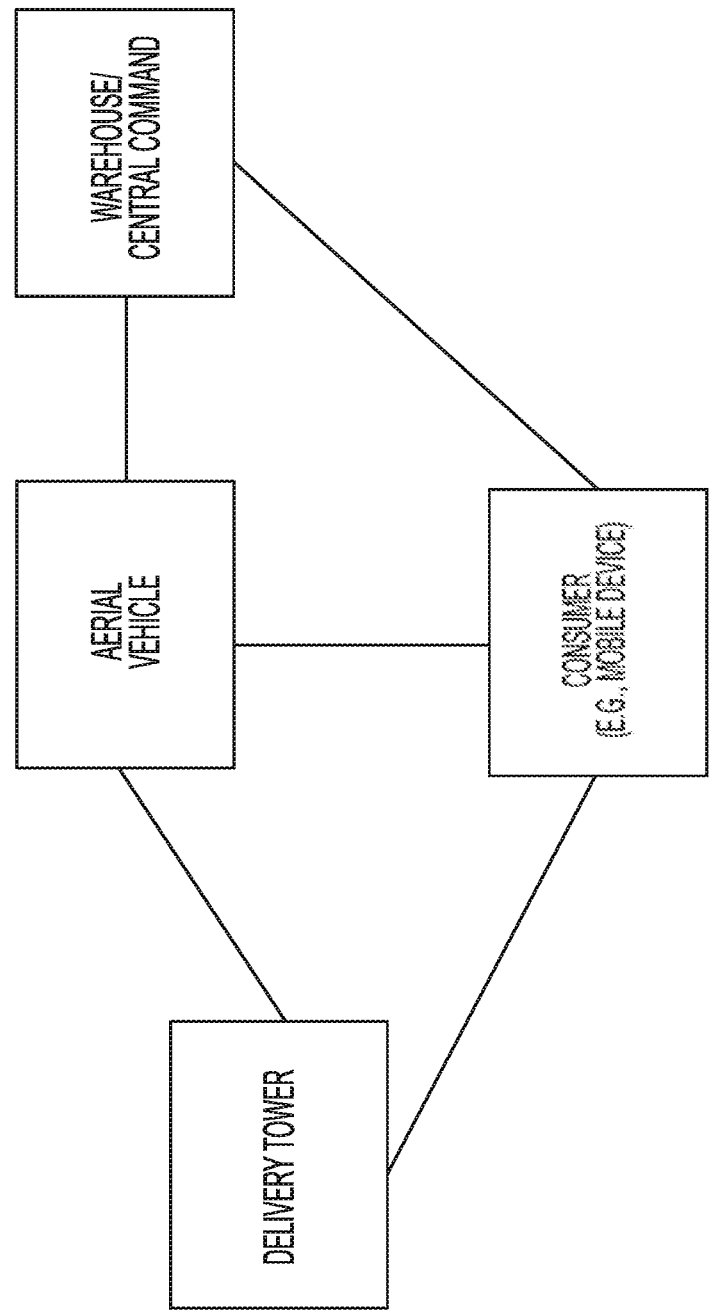
FIG. 6 shows a block diagram of a delivery tower system, according to an embodiment of the present disclosure.

Referring to FIG. 6, a block diagram of a delivery system including one or more of the delivery towers of the present disclosure is depicted. The delivery towers may communicate with the aerial vehicle to receive information on package delivery, receive instructions on deployment, receive instructions of storage, and send confirmation of package receipt. The delivery towers may further communicate with the consumer (e.g., to a consumer's mobile device) to receive information on package delivery, receive instructions on deployment, receive instructions of storage, and send confirmation of package receipt. The aerial vehicle may communicate with the consumer's mobile device to send or receive information on package delivery, send or receive instructions on deployment, send or receive instructions of storage, and send or receive confirmation of package receipt. The aerial vehicle and/or the mobile device may communicate with the warehouse to send or receive information on package delivery, and send or receive confirmation of package receipt.

The delivery towers 10, 30, 50 may have batteries, a communication system, and/or light emitting diode (LED) lights for signaling to the aerial vehicle. The delivery towers 10, 30, 50 may have wheels and drive motors to enable the delivery towers 10, 30, 50 to autonomously, or manually, drive into a clear opening. The delivery towers 10, 30, 50 may be actuated to drive into the clear opening via signal from the aerial vehicle, a consumer's mobile device, and/or manually via control buttons located on the delivery towers 10, 30, 50. By allowing the delivery towers 10, 30, 50 to maneuver and/or drive into a clear opening, one may be sure there are no obstacles, such as roofs, pergolas, trees, covered patios, etc. which obstruct the delivery of the package from the aerial vehicle to the delivery tower 10, 30, 50.

The delivery towers 10, 30, 50 may include bendable or flexible table top portions. The bendable or flexible table top portions may allow for the edges or ends of the delivery towers 10, 30, 50 to bend such that the package may be poured or deposited onto the ground for retrieval by the consumer after delivery onto the table top.

The delivery towers 10, 30, 50 may include a lockbox located below table top leaves. The lock box may secure the package until retrieval by the consumer. In this manner, an aerial vehicle may communicate solely with the delivery towers 10, 30, 50 to deliver a package in the absence of the consumer. The package may be held safe in the lockbox until the package may be retrieved by the consumer, thus preventing theft or damage from weather or debris. The lockbox may be exposed in a similar manner to the previously described rollers or platform during delivery of the package. The lockbox may be fitted with a GPS tracker and/or communication device for package security.

The delivery towers 10, 30, 50 may include a clear pouch on the table top. The clear pouch may house the landing pad identification and/or order identification in a QR code or other machine readable form. Accordingly, the consumer may print the landing pad or order identification and place the same in the clear pouch prior to receiving the package. The aerial vehicle may have sensors or cameras which may read the code ensuring delivery of the proper package to the proper delivery tower.

Figure 7:
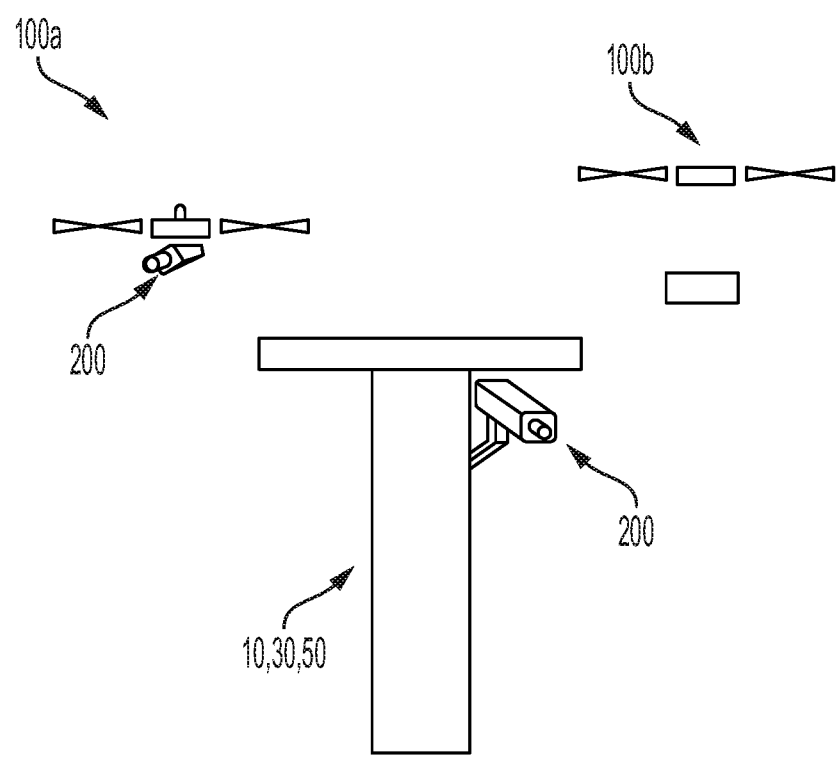
FIG. 7 shows a secondary operation of the delivery tower system, according to an embodiment of the present disclosure.

The delivery tower 10, 30, 50 may have multiple roles. In an exemplary embodiment depicted in FIG. 7, the delivery tower 10, 30, 50 and/or the aerial vehicle 100 may include security cameras 200 mounted thereon. In an exemplary embodiment, the delivery tower may be a community tower which may serve as a neighborhood watch. The community tower may have a permanent resident aerial vehicle or drone 100a. The permanent resident aerial vehicle 100a may launch from the delivery tower to serve as an autonomous neighborhood watch and patrol. When a package is to be delivered, the permanent resident aerial vehicle 100a may move to clear the tower for delivery by delivery aerial vehicle 100b and return after delivery has been completed. The delivery tower may have two-way communication and speaker system to engage with the community. The delivery tower may use proactive behavioral analytics to determine if the delivered package is under threat. When the delivery tower is a neighborhood delivery tower, one or more secondary delivery points may be included to allow for multiple consumers in the neighborhood to receive packages simultaneously or in an overlapping time frame. The secondary delivery points may be equipped with locks and individual codes to allow for security and to allow for each neighborhood consumer to have a personal delivery point.

Alternatively, the delivery tower 10, 30, 50 may be provided with a UAV. The UAV may operate from the delivery tower. The UAV may be launched by the consumer to retrieve a package or product from a vendor. Accordingly, the vendor only need supply the product packaged in a standard box and the consumer supplies the UAV for retrieval of the package. The vendor may provide the package on a separate delivery tower located at the vendor location such that the UAV may retrieve and deliver the package autonomously.

The delivery tower 10, 30, 50 may be provided with a recharging system. The consumer may sell back the recharging services such that the aerial vehicle lands at the delivery tower solely to recharge, or to deliver a package and to recharge. Recharging aerial vehicles may clear the delivery tower to allow for package delivery. Autonomous ground vehicles may also recharge at the delivery tower.

Figure 8:
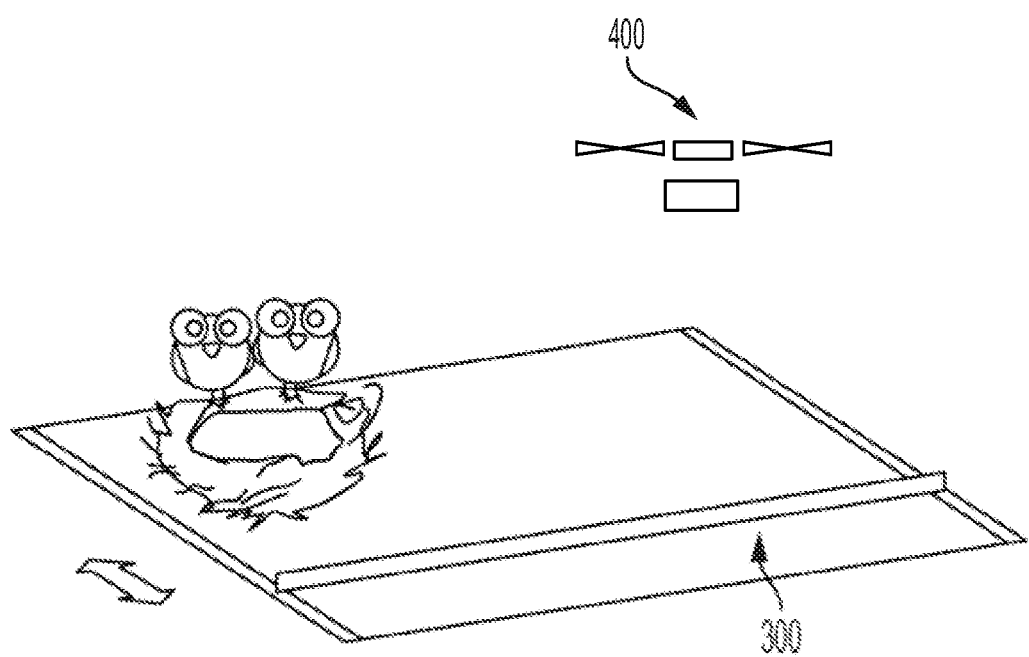
FIG. 8 shows a table top sweeper rod, according to an embodiment of the present disclosure.

Referring to FIG. 8, the delivery tower 10, 30, 50 may be provided with a tower sweeper rod 300 that clears the tower platform of debris (e.g. sticks, leaves, bird nests, etc.) prior to an aerial vehicle 400 landing or delivering a package. The tower may be fitted with a fan or blower so that debris may be removed from critical areas. Maintaining the delivery tower clear of debris may prevent damage to the delivery tower, the aerial vehicle, and the delivered package.

As may be appreciated from the foregoing disclosure, the delivery towers 10, 30, 50 provide multiple uses such that the cost and footprint are reduced. For example, the delivery towers 10, 30, 50 may be used as a dining table or picnic table until delivery of a package is desired. At that time, the delivery towers 10, 30, 50 may have a second use of receiving the package. The delivery towers 10, 30, 50 may have an aesthetically pleasing appearance such that when the delivery towers 10, 30, 50 are in the retracted position of FIG. 1, they appear as outdoor furniture which fits in with a consumer's decor. Thus, as may be appreciated, the delivery towers 10, 30, 50 may be formed of many colors, materials, and shapes such that the consumer may select or customize the delivery towers 10, 30, 50 to their particular aesthetic design. The delivery towers 10, 30, 50 may be flush, telescoping towers that nest and otherwise appear to be a normal part of a consumer's landscape, completely hidden from view except for during use to retrieve a package.

Although the foregoing description is directed to the preferred embodiments of the invention, it is noted that other variations and modifications will be apparent to those skilled in the art and may be made without departing from the spirit or scope of the invention. Moreover, features described in connection with one embodiment of the invention may be used in conjunction with other embodiments, even if not explicitly stated above.

The invention claimed is:

1. A delivery tower for receiving a package from an aerial vehicle, the delivery tower comprising:
   a table top externally coupled to a base including telescoping members, the table top externally coupled to the base via the telescoping members;
   wheels and a drive motor for moving the delivery tower from a first location to a second location, the second location including an open space; and
   a controller and communications module operably coupled to the base;
   wherein the table top is configured to move between a retracted position and an extended position with extension of the telescoping members,
   wherein:
      in the retracted position, the table top of the delivery tower is at a first height and configured to operate as an outdoor table, and
      in the extended position, the table top of the delivery tower is at a second height, greater than the first height, and configured to receive a package from an aerial vehicle, wherein the second height is a variable height based on a signal provided by the aerial vehicle or a consumer that includes one or more parameters including a size and a weight of the package, and
   wherein the delivery tower is configured to communicate with the aerial vehicle or the consumer and is further configured to:
      after receipt of a signal from the aerial vehicle or the consumer, (i) drive into the second location and (ii) automatically move between the retracted position and the extended position, and
      provide another signal to the aerial vehicle indicating that the delivery tower is in the second extended position for delivery of the package.

2. The delivery tower of claim 1, further comprising a manual control, the manual control including buttons, wherein the buttons are configured to extend and retract the table top.

3. The delivery tower of claim 1, further comprising a tilting device, the tilting device configured to move the table top between a horizontal position and an angled position.

4. The delivery tower of claim 3, further comprising an extendable leaf, the extendable leaf configured to have a position nested within the table top and a position extended outside of the table top.

5. The delivery tower of claim 1, wherein the table top further comprises a first table top portion and a second table top portion, wherein the first table top portion and the second table top portion are configured to extend in opposing directions.

6. The delivery tower of claim 5, further comprising a plurality of rollers, wherein the plurality of rollers are exposed when the first table top portion and the second table top portion are extended, the plurality of rollers configured to move the package to an edge of the table top.

7. The delivery tower of claim 1, wherein:
   while in the retracted position, the table top is configured to support consumer uses that do not include package delivery from the aerial vehicle; and
   while in the extended position, the table top is configured to support package delivery from the aerial vehicle without supporting consumer uses that do not include package delivery from the aerial vehicle.

8. A method for aerial delivery of a package to a delivery location, the method comprising:
   providing a delivery tower on a consumer's property;
   moving the delivery tower from a first location to a second location, the second location including an open space, based on a first signal communicated from an aerial vehicle to the delivery tower when the aerial vehicle is within a predetermined distance from the delivery tower;
   extending a table top from a retracted position to an extended position based on a second signal communicated from the aerial vehicle to the delivery tower, wherein:
      the table top is externally coupled to the delivery tower via telescoping members,
      the retracted position is at a first height and configured to operate as an outdoor table, and
      the extended position is at a second height, greater than the first height, and configured to receive a package from an aerial vehicle, the second height being a variable height based on the second signal communicated from the aerial vehicle to the delivery tower that includes one or more parameters including a size and a weight of the package;
   providing a third signal from the delivery tower to the aerial vehicle indicating that the delivery tower is in the extended position for delivery of the package;
   depositing the package from the aerial vehicle onto the table top of the delivery tower;
   retracting the table top from the extended position based on a fourth signal communicated from the aerial vehicle to the delivery tower; and
   retrieving the package from the table top.

9. The method of claim 8, wherein moving the delivery tower further comprises actuating one or more drive motors coupled to one or more wheels.

10. The method of claim 8, wherein extending the table top further comprises extending a plurality of telescoping members vertically to the extended position.

11. The method of claim 10, wherein retracting the table top further comprises retracting the plurality of telescoping members vertically to the retracted position.

12. The method of claim 8, wherein depositing the package further comprises lowering the package from the aerial vehicle on a rope, on a cable, with a parachute, or with a dropping device.

13. The method of claim 8, wherein retrieving the package from the table top includes tilting the table top from a horizontal position to an angled position.

14. The method of claim 8, wherein depositing the package from the aerial vehicle includes extending a first portion of the table top and a second portion of the table top in opposing direction to expose a plurality of rollers and depositing the package on the plurality of rollers.

15. The method of claim 14, wherein retrieving the package from the table top includes actuating the plurality of rollers to move the package to an edge of one of the first portion of the table top and the second portion of the table top.

\* \* \* \* \*